(12) United States Patent
Liao

(10) Patent No.: US 11,543,058 B2
(45) Date of Patent: Jan. 3, 2023

(54) CLAMPING SEAT OF TELESCOPIC ROD

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 256 days.

(21) Appl. No.: 16/938,429

(22) Filed: Jul. 24, 2020

(65) Prior Publication Data

US 2022/0025997 A1  Jan. 27, 2022

(51) Int. Cl.
  *F16B 7/14* (2006.01)
  *F16L 21/06* (2006.01)
  *F16L 33/04* (2006.01)
  *F16M 11/26* (2006.01)

(52) U.S. Cl.
  CPC .......... *F16L 21/065* (2013.01); *F16B 7/1418* (2013.01); *F16B 7/1472* (2013.01); *F16L 33/04* (2013.01); *F16M 11/26* (2013.01); *Y10T 403/32491* (2015.01); *Y10T 403/7084* (2015.01)

(58) Field of Classification Search
  CPC ......... F16L 21/065; F16L 21/06; F16L 21/12; F16L 27/127; F16L 27/125; F16L 27/1273; F16L 27/1275; F16L 33/04; F16B 7/1418; F16B 7/1472; Y10T 403/32491; Y10T 403/7084

USPC .................................................. 285/298, 302
See application file for complete search history.

(56) References Cited

U.S. PATENT DOCUMENTS

| 6,977,332 B2 | 12/2005 | Liao | |
| 2012/0001416 A1* | 1/2012 | Peng | F16B 7/1472 285/145.1 |
| 2015/0240850 A1* | 8/2015 | Sato | F16B 7/1418 403/104 |

* cited by examiner

*Primary Examiner* — Aaron M Dunwoody
(74) *Attorney, Agent, or Firm* — Muncy, Geissler, Olds & Lowe, P.C.

(57) ABSTRACT

A clamping seat includes a pipe seat, a movable clamp and a fixed clamp. The pipe seat includes an inner pipe space and an outer pipe space to insert the inner pipe and the outer pipe. The pipe seat includes a side opening beside the inner pipe space and a side space beside the outer pipe space. The movable clamp includes an arc block beside the side opening, and a screwing member pressing the arc block into the inner pipe space then to press and fix the inner pipe. The fixed clamp includes a clamping plate in the side space, and a tightening bolt pressing the pipe seat against the clamping plate, allowing the clamping plate to press the outer pipe.

9 Claims, 6 Drawing Sheets

CLAMPING SEAT OF TELESCOPIC ROD

FIELD OF THE INVENTION

The invention relates to a telescopic rod with an inner pipe and an outer pipe, in particular to a clamping seat of the telescopic rod for clamping and fixing the inner pipe and the outer pipe.

BACKGROUND OF THE INVENTION

Telescopic rod is a common supporting structure for a lamp, musical instrument and the like. As shown in FIG. 1, it is a prior art disclosed in U.S. Pat. No. 6,977,332 B2 and comprises an inner pipe 1 and an outer pipe 2 which are sleeved with each other. The height of the inner pipe 1 and the outer pipe 2 is adjusted by fixing and stressing the relative positions of the inner pipe 1 and the outer pipe 2 by a screw 3. However, when it is overloaded, in order to avoid sliding between the inner pipe 1 and the outer pipe 2, a user may lock the screw 3 excessively, causing a rod body of the inner pipe 1 to be deformed by over-pressing of the screw 3. After the inner pipe 1 is deformed, the gap between the inner pipe 1 and the outer pipe 2 is increased, causing problems of structural bending, shaking and the like. In addition, during maintenance, the inner pipe 1 and the outer pipe 2 are not easily disassembled, or the inner pipe and the outer pipe 2 are damaged together to increase maintenance cost.

SUMMARY OF THE INVENTION

The main purpose of the present invention is to disclose a clamping seat of a telescopic rod, which is used for clamping an inner pipe and an outer pipe respectively and in a large-area contact mode, thereby preventing the inner pipe and the outer pipe from being damaged together. Also, the inner pipe and the outer pipe can be replaced and maintained respectively to reduce the cost.

To achieve the above object, the present invention provides a clamping seat of a telescopic rod for clamping an inner pipe and an outer pipe. The clamping seat of the telescopic rod comprises a pipe seat, a movable clamp and a fixed clamp. The pipe seat comprises an inner pipe space which diameter is corresponding to the diameter of the inner pipe, an outer pipe space which diameter is corresponding to the diameter of the outer pipe, a side opening and a side space. The inner pipe space is communicated with the outer pipe space and respectively allows the inner pipe and the outer pipe to inset therein. The side opening is positioned next to the inner pipe space, and the side space is positioned next to the outer pipe space. The movable clamp comprises an arc block and a screwing member. The arc block is pivoted on the pipe seat and is adjacent to the side opening, and the screwing member passes through the arc block and the pipe seat and tightly presses the arc block. The arc block passes through the side opening and transversely passes into the inner pipe space to tightly press and fix the inner pipe. The fixed clamp comprises a clamping plate and a tightening bolt. The clamping plate is placed in the side space, and the tightening bolt is screwed through the pipe seat to press against the clamping plate, wherein the clamping plate transversely passes into the outer pipe space to press the outer pipe.

According to the invention, the inner pipe and the outer pipe are respectively fixed on the pipe seat instead of directly contacting the inner pipe and the outer pipe as known, so that the inner pipe and the outer pipe are prevented from being damaged together. Also, the arc block and the clamping plate are respectively contacted with the inner pipe and the outer pipe in a large area to enhance stability and avoid the problem of local deformation of the inner pipe and the outer pipe.

DETAILED DESCRIPTION OF THE PREFERRED

Embodiments

Figure 1:
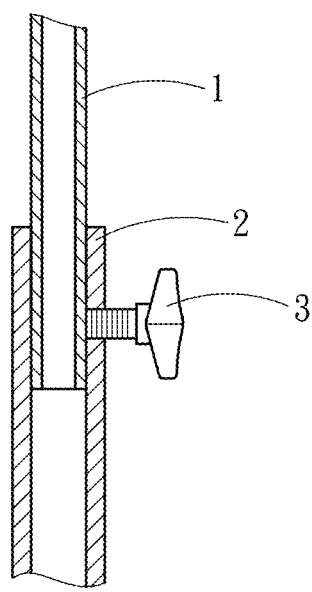
FIG. 1 is a structure diagram of a conventional telescopic rod.
Figure 2:
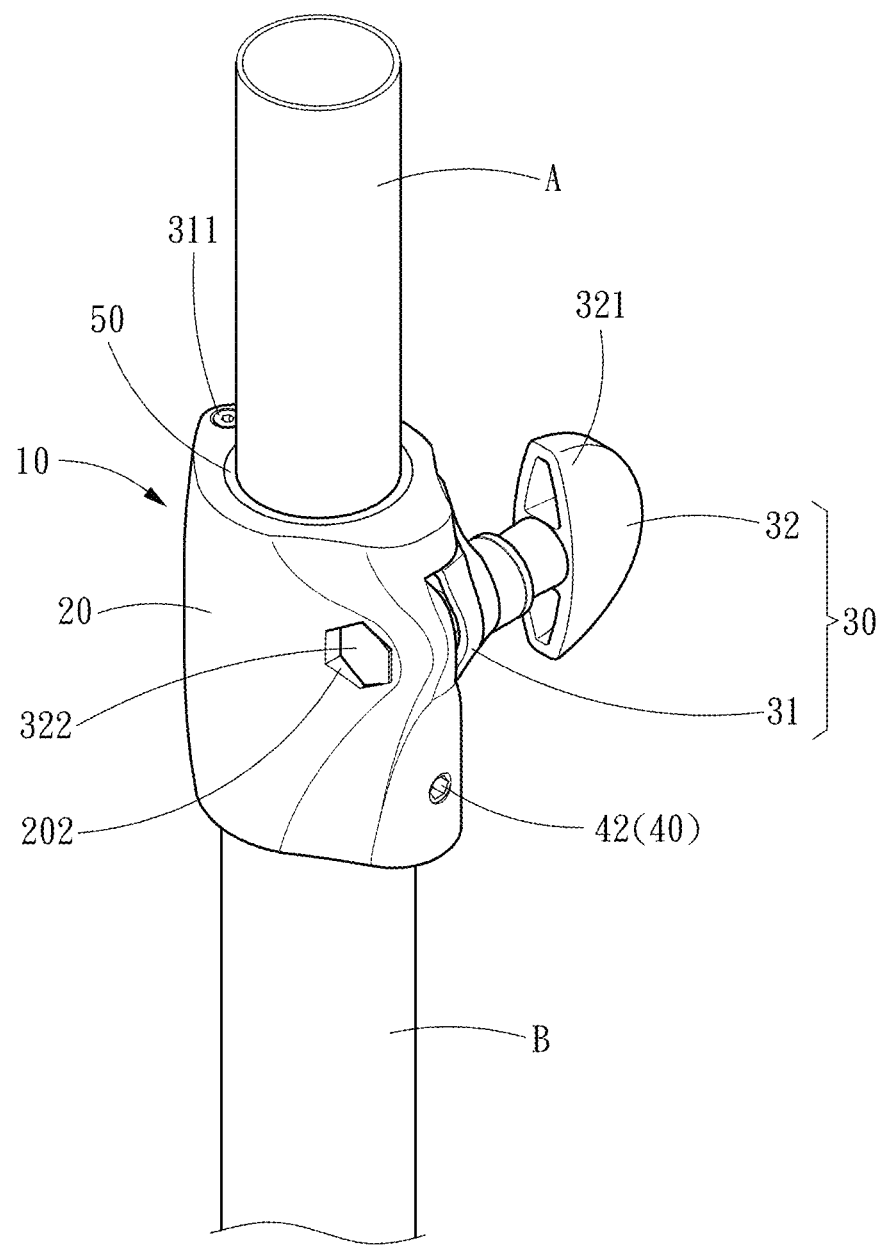
FIG. 2 is a combined structure diagram of the present invention.
Figure 3:
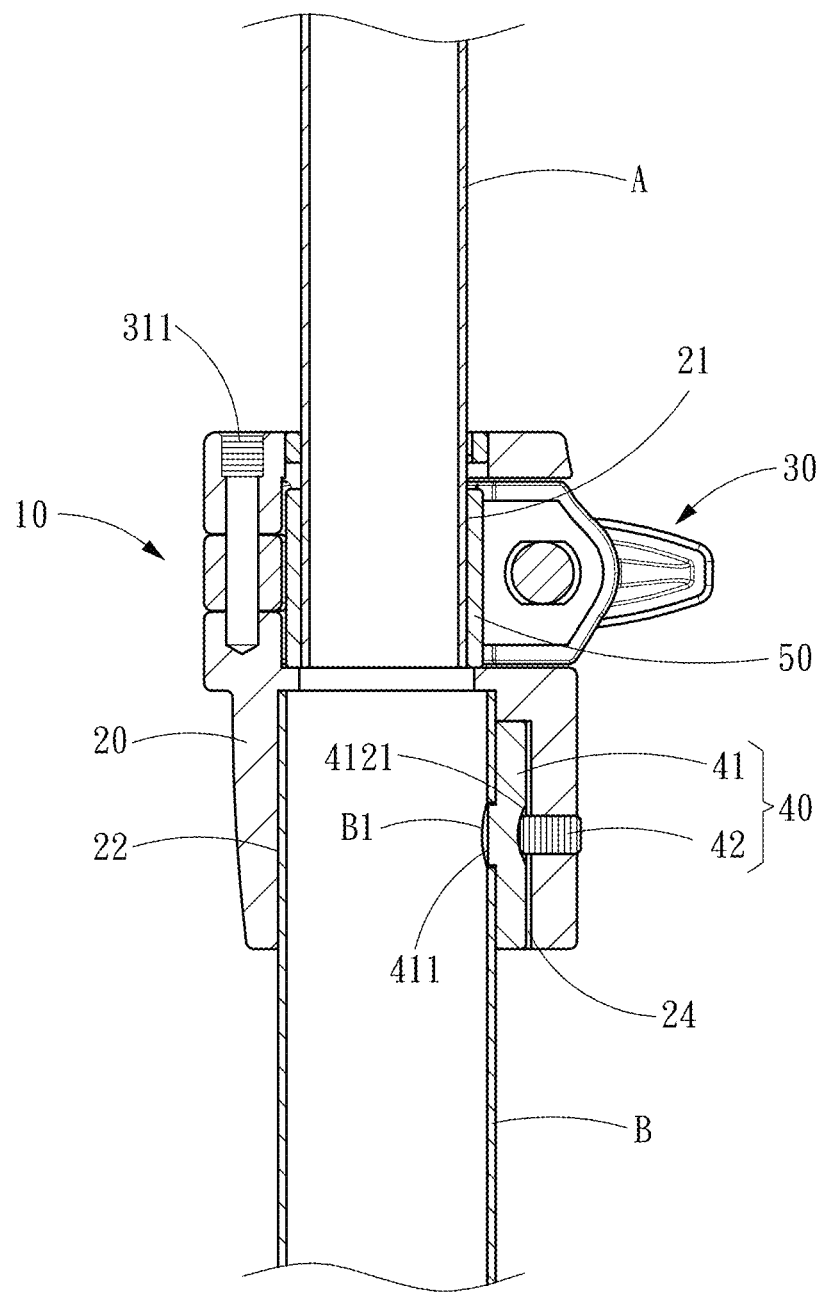
FIG. 3 is a combined sectional view of the present invention.
Figure 4:
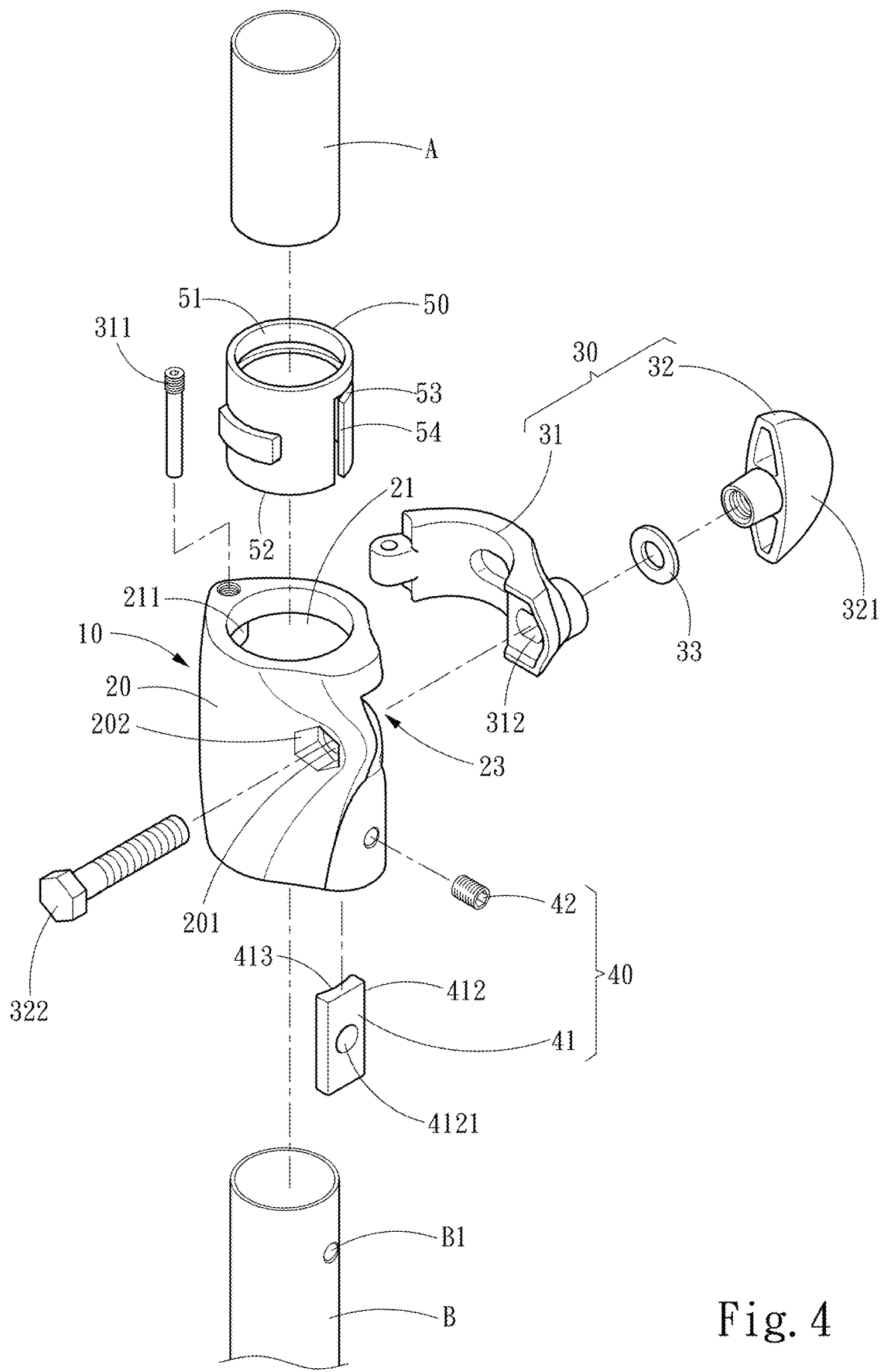
FIG. 4 is an exploded structure view of the present invention.
Figure 5:
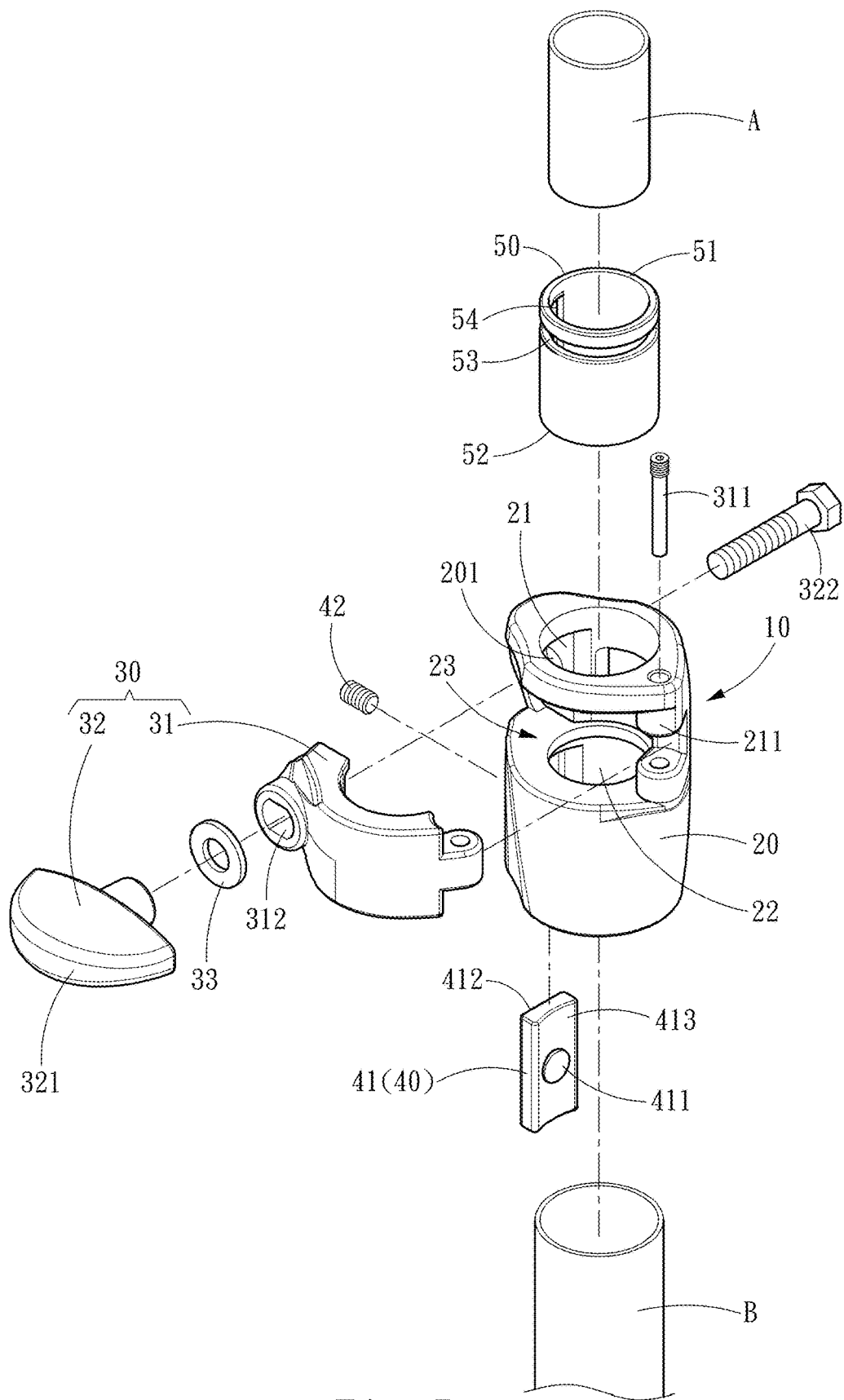
FIG. 5 is an exploded structure view from another angle of the present invention.

The technical content, feature and efficacy of the present invention will become apparent from the following detailed description of preferred embodiments in conjunction with the accompanying drawings.

Referring to FIG. 2, FIG. 3, FIG. 4 and FIG. 5, the invention provides a clamping seat 10 of a telescopic rod for clamping an inner pipe A and an outer pipe B. The clamping seat 10 of the telescopic rod comprises a pipe seat 20, a movable clamp 30 and a fixed clamp 40.

The pipe seat 20 includes an inner pipe space 21 which diameter is corresponding to the diameter of the inner pipe A, an outer pipe space 22 which diameter is corresponding to the diameter of the outer pipe B, a side opening 23 and a side space 24. The inner pipe space 21 is communicated with the outer pipe space 22 and respectively allows the inner pipe A and the outer pipe B to insert therein. The side opening 23 is positioned next to the inner pipe space 21, and the side space 24 is positioned next to the outer pipe space 22. In an embodiment, the invention further comprises a bushing 50, wherein a hardness of the bushing 50 is lower than the inner pipe A, and the inner pipe A inserts into the inner pipe space 21 at an interval of the bushing 50. That is, the inner pipe A passes into the bushing 50 first, and then passes into the inner pipe space 21 at the interval of the bushing 50, so that the inner pipe A is protected by the bushing 50 to prevent from being scratched during inserting into the inner pipe space 21, so as to increase the stability after assembly. The bushing 50 also comprise a passing-into end 51, a passing-out end 52, a transverse notch 53 which is adjacent to the passing-into end 51, and an axial notch 54 which is communicated with the transverse notch 53 and extending to the passing-out end 52. Accordingly, the inner pipe A passes into the bushing 50 from the passing-into end 51 and passes out from the passing-out end 52, and the transverse notch 53 and the axial notch 54 allow the bushing 50 to be slightly expanded to increase the inner diameter in order for facilitating the inner pipe A passing into the bushing 50.

The movable clamp 30 comprises an arc block 31 and a screwing member 32. The arc block 31 is pivoted on the pipe seat 20 and is adjacent to the side opening 23; and the screwing member 32 passes through the arc block 31 and the pipe seat 20 and presses the arc block 31 to allow the arc block 31 passing through the side opening 23 and transversely passing into the inner pipe space 21 to tightly press and fix the inner pipe A. In an embodiment, the arc block 31 is pivoted to the pipe seat 20 by a plug pin 311, the screwing member 32 includes a knob 321 and a bolt 322, and the pipe seat 20 and the arc block 31 are respectively provided with a pipe seat through-hole 201 and an arc block through-hole 312. The bolt 322 passes through the pipe seat through-hole 201 and the arc block through-hole 312 to be screwed and locked on the knob 321. The pipe seat through-hole 201 includes a depressed slot 202 which is provided for the bolt 322 to press against and block the bolt 322 not to rotate, and the knob 321 presses against the arc block 31, so that the arc block 31 is pressed to move when the knob 321 rotates; since the arc block 31 is pivoted to the pipe seat 20, the arc block 31 is rotated with respect to the pipe seat 20 to transversely pass into the inner pipe space 21. A circular gasket 33 is provided between the knob 321 and the arc block 31, and the circular gasket 33 assists the knob 321 to press against the arc block 31.

With the structure as described above, the position of the inner pipe A with respect to the inner pipe space 21 can be adjusted when the movable clamp 30 is slightly loosened. That is, the inner pipe A can be moved with respect to the inner pipe space 21. In order to increase the stability of the movement of the inner pipe A with respect to the inner pipe space 21, the inner pipe space 21 includes a side arc block 211 at a side which is distant from the side opening 23, and the side arc block 211 clamps the inner pipe A together with the arc block 31, so that the inner pipe A is not easily shaking on the basis of the side arc block 211 being as a contact surface when the inner pipe A moves.

Further, the fixed clamp 40 comprises a clamping plate 41 and a tightening bolt 42, the clamping plate 41 is placed in the side space 24, and the tightening bolt 42 is screwed through the pipe seat 20 to press the clamping plate 41, so that the clamping plate 41 transversely passes into the outer pipe space 22 to press the outer pipe B. In an embodiment, the clamping plate 41 includes a convex portion 411, and the outer pipe B includes a concave hole B1 corresponding to the convex portion 411 to assist in positioning via fastening the convex portion 411 with the concave hole B1, so as to rapidly finish the clamping plate 41 to be positioned. The clamping plate 41 includes a plane 412 and an arc surface 413, wherein the tightening bolt 42 is pressed against the plane 412, and the arc surface 413 is opposite to the plane 412 and pressing against the outer pipe B. Further, the plane 412 includes a depressed hole 4121 to be configured correspondingly to the tightening bolt 42 and allow the tightening bolt 42 to be inserted in, thereby increasing the stability of the structure.

Figure 6:
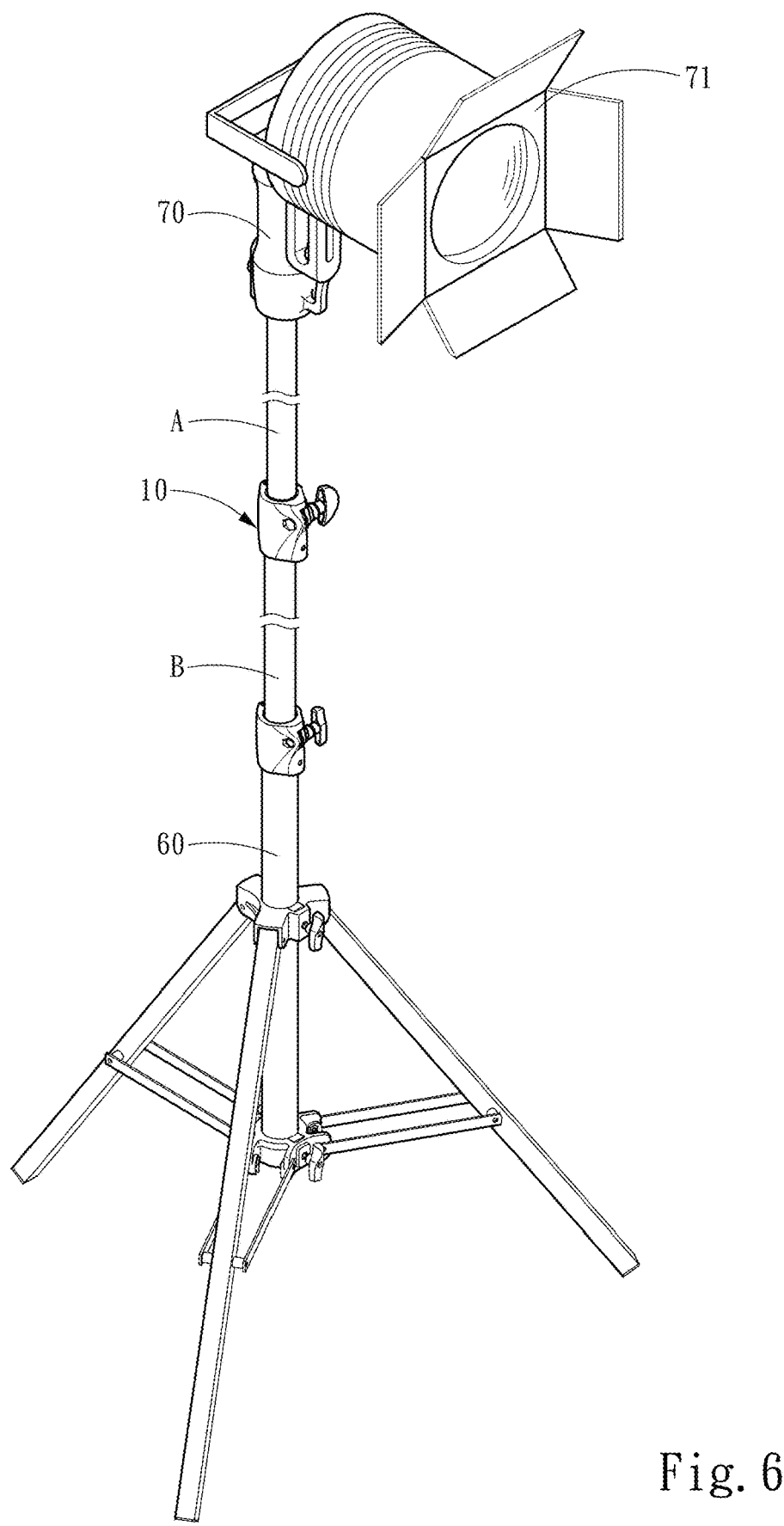
FIG. 6 is a structure diagram in which the present invention is applied to support lamplights.

Referring to FIG. 6, it is a schematic diagram of a structure used to support a lighting device. The clamping seat 10 of the telescopic rod clamps the inner pipe A and the outer pipe B. The outer pipe B is arranged on a foot frame 60, and the inner pipe A is provided with a lamplight rod 70 to hang on a lamplight 71. Thus the lamplight 71 can meet lighting requirements after being lighted up.

As described above, the advantages of the present invention include at least the following.

1. The inner pipe and the outer pipe of the invention are respectively fixed on the pipe seat instead of directly contacting the inner pipe and the outer pipe as known, so that the inner pipe and the outer pipe are prevented from being damaged together.

2. The arc block and the clamping plate are respectively contacted with the inner pipe and the outer pipe in a large area to enhance stability and avoid the problem of local deformation of the inner pipe and the outer pipe, and the inner pipe and the outer pipe are conveniently replaced for maintenance.

3. By the arrangement of the bushing, the inner pipe is prevented from being scratched, and the stability after assembly is improved.

4. By the arrangement of the side arc block of the inner pipe space, the side arc block is used as a contact surface when the inner pipe moves, so that the inner pipe cannot easily shake.

What is claimed is:

1. A clamping seat of a telescopic rod for clamping an inner pipe and an outer pipe, comprising:
   a pipe seat, comprising an inner pipe space, wherein a diameter of the inner pipe space is corresponding to a diameter of the inner pipe, an outer pipe space, wherein a diameter of the outer pipe space is corresponding to a diameter of the outer pipe, a side opening and a side space, wherein the inner pipe space is communicated with the outer pipe space and respectively allows the inner pipe and the outer pipe to insert, the side opening is positioned next to the inner pipe space, and the side space is positioned next to the outer pipe space;
   a movable clamp, comprising an arc block and a screwing member, the arc block pivoted on the pipe seat and adjacent to the side opening, the screwing member passing through the arc block and the pipe seat and tightly pressing the arc block, wherein the arc block passes through the side opening and transversely passes into the inner pipe space to tightly press and fix the inner pipe;
   a fixed clamp, comprising a clamping plate and a tightening bolt, the clamping plate placed in the side space, and the tightening bolt screwed through the pipe seat to press against the clamping plate, wherein the clamping plate transversely passes into the outer pipe space to press the outer pipe; and
   a bushing, comprising a passing-into end, a passing-out end, a transverse notch adjacent to the passing-into end, and an axial notch communicated with the transverse notch and extending to the passing-out end; wherein the inner pipe passes into the inner pipe spaced at an interval of the bushing.

2. The clamping seat of the telescopic rod of claim 1, wherein a hardness of the bushing is lower than a hardness of the inner pipe.

3. The clamping seat of the telescopic rod of claim 1, wherein the clamping plate comprises a convex portion, and the outer pipe comprises a concave hole corresponding to the convex portion.

4. The clamping seat of the telescopic rod of claim 1, wherein the clamping plate comprises a plane and an arc surface, the plane is pressed by the tightening bolt, the arc surface is opposite to the plane and pressing against the outer pipe.

5. The clamping seat of the telescopic rod of claim 4, wherein the plane comprises a depressed hole corresponding to the tightening bolt.

6. The clamping seat of the telescopic rod of claim 1, wherein the inner pipe space comprises a side arc block at one side distant from the side opening, and the side arc block clamps the inner pipe together with the arc block.

7. The clamping seat of the telescopic rod of claim 1, wherein the arc block is pivoted to the pipe seat by a plug pin.

8. The clamping seat of the telescopic rod of claim 1, wherein the screwing member comprises a knob and a bolt, the pipe seat and the arc block are respectively provided with a pipe seat through-hole and an arc block through-hole to allow the bolt to pass through the pipe seat through-hole and the arc block through-hole and to be screwed and locked on the knob, and the pipe seat through-hole is provided with a depressed slot for the bolt to press against and block the bolt from rotating, and wherein the knob presses against the arc block for rotating and pressing the arc block to transversely pass into the inner pipe space.

9. The clamping seat of the telescopic rod of claim 8, wherein a circular gasket is provided between the knob and the arc block.

* * * * *